United States Patent [19]

Awadalla

[11] Patent Number: 5,261,945
[45] Date of Patent: Nov. 16, 1993

[54] SELECTIVE RECOVERY OF GOLD AND SILVER FROM CARBONATE ELUATES

[75] Inventor: Farouk T. Awadalla, Hull, Canada

[73] Assignee: Her Majesty the Queen in Right of Canada as represented by the Minister of Energy, Mines and Resources, Canada

[21] Appl. No.: 916,727

[22] Filed: Jul. 22, 1992

[51] Int. Cl.⁵ .................................. C22B 3/44
[52] U.S. Cl. .................................... 75/741
[58] Field of Search .......................... 75/741

[56] References Cited

U.S. PATENT DOCUMENTS

| | | | |
|---|---|---|---|
| 3,082,079 | 3/1963 | Bulloch et al. | 75/713 |
| 3,334,995 | 8/1967 | Gaspar. | |
| 3,770,423 | 11/1973 | Lores et al. | |
| 4,092,154 | 5/1978 | Dietz, Jr. et al. | 252/188 |
| 4,131,455 | 12/1978 | Edwards et al. | |
| 4,279,644 | 7/1981 | Friar et al. | 354/277 |
| 4,681,628 | 7/1987 | Griffin et al. | 423/29 |
| 4,778,519 | 10/1988 | Pesic | 423/24 |
| 5,178,665 | 1/1993 | Haque | 75/741 |

FOREIGN PATENT DOCUMENTS 210070 4/1921 Canada.
1090584 12/1980 Canada.

Primary Examiner—Melvyn J. Andrews
Attorney, Agent, or Firm—Sughrue, Mion, Zinn, Macpeak & Seas

[57] ABSTRACT

A process is disclosed for the direct and selective recovery of gold and/or silver from carbonate solutions, such as sodium carbonate which is used as an eluant for gold in a carbon-in-pulp process (CIP). The process comprises reduction precipitation of gold and/or silver from a carbonate solution having a pH in the alkaline range by the addition of stabilized alkali metal borohydride, such as sodium borohydride. The resulting gold and/or silver precipitate is generally of high purity and readily separated by filtration. The barren solution is in a condition such that it can be recycled to the upstream process.

11 Claims, 8 Drawing Sheets

SELECTIVE RECOVERY OF GOLD AND SILVER FROM CARBONATE ELUATES

FIELD OF THE INVENTION

This invention relates to a process for the recovery of metallic gold and/or silver from gold and/or silver-containing carbonate solution. The invention further relates to a process for the recovery of metallic gold and silver generally of high purity from pregnant solutions obtained as a result of the leaching of gold and silver ore or concentrates by processes generally known in the industry.

DESCRIPTION OF RELATED ART

Hitherto, there have existed two principal methods of recovering gold from gold and silver ores or concentrates. The first method involves cyanidation followed by the Merrill-Crowe process wherein gold is recovered from solution by cementation with zinc powder which must then be refined to obtain gold metal. The process offers high gold recovery, but with low purity.

The second method comprises cyanidation followed by recovery using activated carbon followed by electrolysis. Elution of gold and silver from loaded carbon is most commonly performed using an alkali cyanide solution. Because of the toxicity of cyanide, additional steps are required for its handling and subsequent elimination. This significantly increases the operating costs of these processes.

The following Table 1 summarizes various systems used for gold elution and the problems encountered in each system.

TABLE 1

Elution of gold from carbon (3)

| Process | Eluant | Temperature (°C.) | Time (h) | Problems |
|---|---|---|---|---|
| USBM, Zadra | 1% NaOH, 0.2% NaCN | 98 | 48 | Slow desorption |
| Zadra, modified | 1% NaOH, 0.2% NaCN | 140 | 12 | Autoclave elution, under pressure |
| Smoky Valley | 1% NaOH, 0.1% NaCN | 88 | 52 | 1 day presoak |
| Anglo | presoak in 5% NaCN & 1% NaCN, Deion-$H_2O$ | 100 | 10 | Quality of $H_2O$ is critical |
| Duval/Battle Mountain | 20% Ethanol, 1% NaOH, 1% NaCN | 77 | 24 | Solvent loss & fire hazard during EW |
| Micron | NaCN presoak, Methanol reflux | | 6 + 2 | Solvent loss |
| Murdoch | 1% NaCN/ Acetonitrile reflux | | 4 + 2 | |

The current practice for recovering gold and silver from carbonate eluates is electrowinning. Although this is generally effective, it has been found that electrowinning of solutions of relatively low pH (<12), is associated with many problems such as anode corrosion, scale formation and less than successful gold and silver recovery. On the other hand, cementation was found to be unsuccessful in the recovery of gold and silver from carbonate solution.

More recently, Awadalla et al have developed a method for precious metal recovery from acidic aqueous solutions using sodium borohydride (See Canadian Patent Application No. 2,016,492 and U.S. Pat. application Ser. No. 647,988). However, there is no well established method of recovering gold and silver from basic solutions, such as carbonate solutions.

The reducing power of sodium borohydride has long been exploited for industrial applications such as pollution control and the removal and/or recovery of various metal cations from solution. Currently, sodium borohydride is finding application in the recovery of silver from spent photographic liquor (thiosulfate solution), as disclosed in U.S. Pat. No. 3,082,079, or spent electrolyte and platinum group metals from acidic leach liquor. However, there has been no suggestion of a sodium borohydride reduction process for the recovery of gold and silver from carbonate liquors. Dietz, Jr. et al (Canadian Patent No. 1,090,584) teaches a reduction precipitating agent containing aluminium, an alkali metal borohydride and a hydrazine compound for recovering precious metal values including gold from aqueous alkaline cyanide solutions. This prior process suffers from cyanide effluent problems as well as material losses due to the necessity for cyanide effluent destruction.

SUMMARY OF THE INVENTION

It is an object of the present invention to provide a simple and economic method for recovering high purity metallic gold and/or silver directly from aqueous carbonate solution.

Accordingly, the invention provides a process for recovering high purity metallic gold and silver from a basic carbonate solution containing gold and/or silver values, which comprises: (a) adjusting the pH value of the gold and/or silver-containing solution with acid to a level between 7 and 11; (b) treating the alkaline solution with stabilized alkali metal borohydride in an amount at least stoichiometrically equal to the amount of gold and/or silver compounds present in the solution so as to precipitate metallic gold and/or silver; and (c) separating the metallic precipitate.

Suitably, stabilized borohydride solutions containing about 0.45% to 5% by weight borohydride stabilized in a caustic medium containing 1.7% to 17% by weight hydroxide may be used for reduction precipitation according to the invention. Both the borohydride and the hydroxide may be in the form of sodium compounds (sodium borohydride and sodium hydroxide) or potassium compounds (potassium borohydride and potassium hydroxide) or any combination of these yielding compositions lying in the stated ranges.

In a preferred embodiment of invention, reduction precipitation is effected by stabilized sodium borohydride in the form of VenMet* solution (12% $NaBH_4$, 40% NaOH).

*trade-mark

BRIEF DESCRIPTION OF THE DRAWINGS

Embodiments of the invention will now be described, by way of example, with reference to the accompanying drawings, in which.

DETAILED DESCRIPTION OF THE INVENTION

It has been also found that an important factor in the use of stabilized sodium borohydride for reduction precipitation is pH control. Through extensive experimentation it was found that the reduction efficiency of stabilized sodium borohydride peaked at approximately pH 8.0 to 9.0, which is the most preferred range for operating the process of the invention. Furthermore, it was found that satisfactory reduction efficiency occurred when using stabilized sodium borohydride in a pH range of about 7.0 to 10.0. To avoid the evolution of toxic hydrogen cyanide gas, the pH is suitably kept in an alkaline range of 8.0 or more.

For illustration purposes, two solutions obtained from two different gold mills currently using carbonate elution were used for experimentation. Solution A was a carbonate solution with an initial pH of 9.43; and Solution B was a mixture of carbonate and hydroxide with an initial pH of 12.88. Other metallic elements contained in Solutions A and B are shown in Table 2.

TABLE 2

The analysis of plant carbonate solutions derived from elution of loaded carbon in CIP process

| Element | Concentration, ppm Solution "A" | Solution "B" |
| --- | --- | --- |
| Au | 165 | 287.8 |
| Ag | 7.6 | 49.2 |
| Cu | 3.5 | 7.8 |
| Ni | 36.0 | 40.1 |
| Fe | 7.4 | 4.3 |
| Mg | 4.6 | ND |
| Co | 1.1 | ND |
| Na | 7800 | 9000 |
| CN-free | 28.0 | 42.0 |
| -total | 9.4 | 209 |

ND = Not determined

INITIAL pH OF THE CARBONATE SOLUTION

Figure 3:
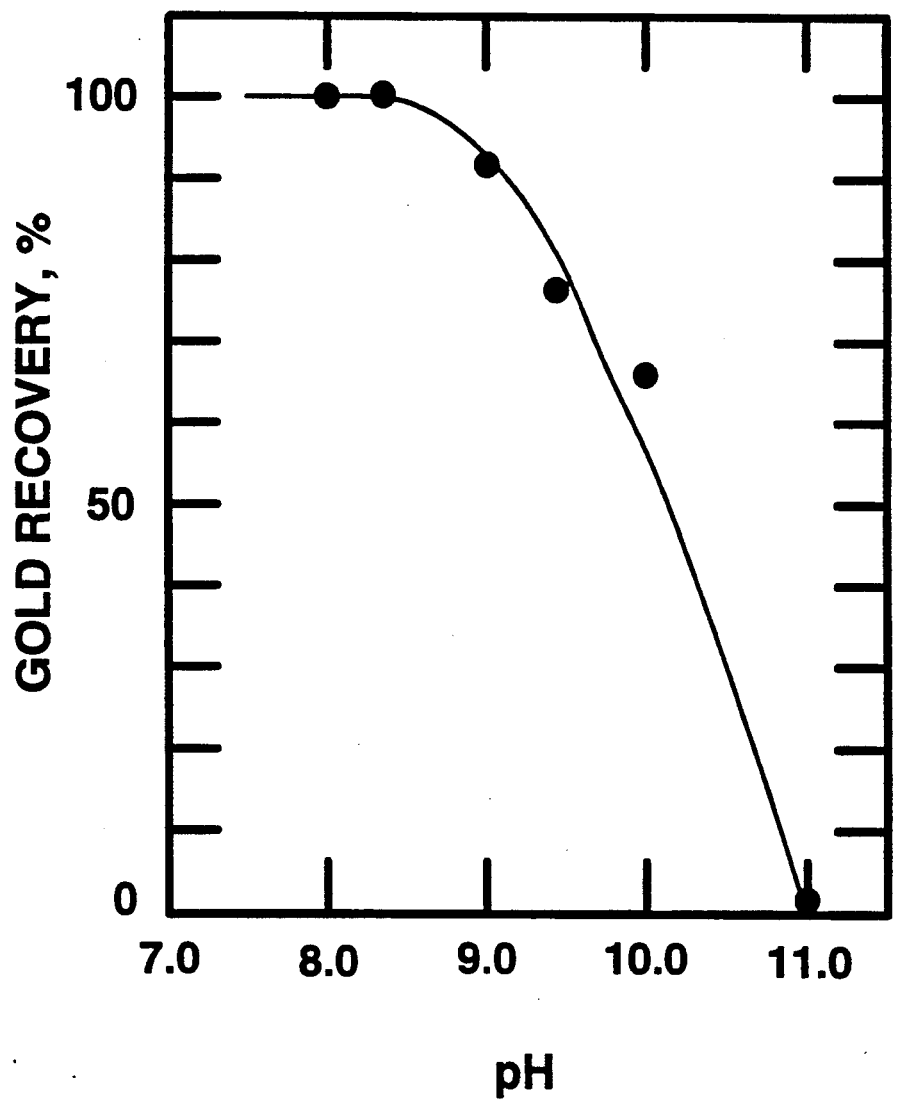
FIG. 3 shows the effect of initial pH on the reduction of gold from Solution A, one hour reaction time, SBH/Au=7.6 at room temperature.

Analysis has shown that the initial pH of the carbonate solution is determinative of the efficiency of reduction precipitation. At the natural pH of carbonate solution (pH=9.4), it was found that the precipitation of gold and silver is substantial. No reduction precipitation was observed at an initial pH of 11 (FIG. 3).

The maximum recovery of gold from Solution A was attained at a pH between 8.0 to 9.0, whereas no reduction of gold was observed in Solution B. It was found that the final pH was increased slightly through the addition of VenMet solution because VenMet solution contains 40 wt % NaOH. For example, on adding 0.1 ml of VenMet solution to ml of Solutions A and B and initial pH=8.0, the final pH values obtained after 10 minutes reaction time were 9.0 and 8.5, respectively. It was also found that the time required to initiate observable precipitation of gold increased with increasing initial solution pH, e.g.: at initial pH values of 8, 9 and 10, this induction period for Solution A was 1, 2 and 10 minutes, respectively.

STOICHIOMETRY

Sodium borohydride is known to be a strong reductant as eight electrons, produced per mole of $NaBH_4$, reduce eight moles of monovalent ion such as $Au+$ or $Ag+$:

$$8M^+ + BH_4 + 2H_2O \rightarrow 8M^* + BO_2 + 4H_2 \quad (1)$$

wherein M=Au or Ag.

In practice, however, more than the stoichiometric amount of $NaBH_4$ is required to achieve complete reduction. Gold and silver ions are present on the activated carbon as cyanide complexes, and are expected to be in the carbonate eluate also as cyanide complexes. The reaction can, therefore, be represented as follows:

$$2M(CN)_2 + BH_4 + 2OH \rightarrow 2M^* + 4CN^- + BO_2 + 3H_2 \quad (2)$$

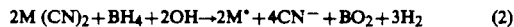

Figure 1:
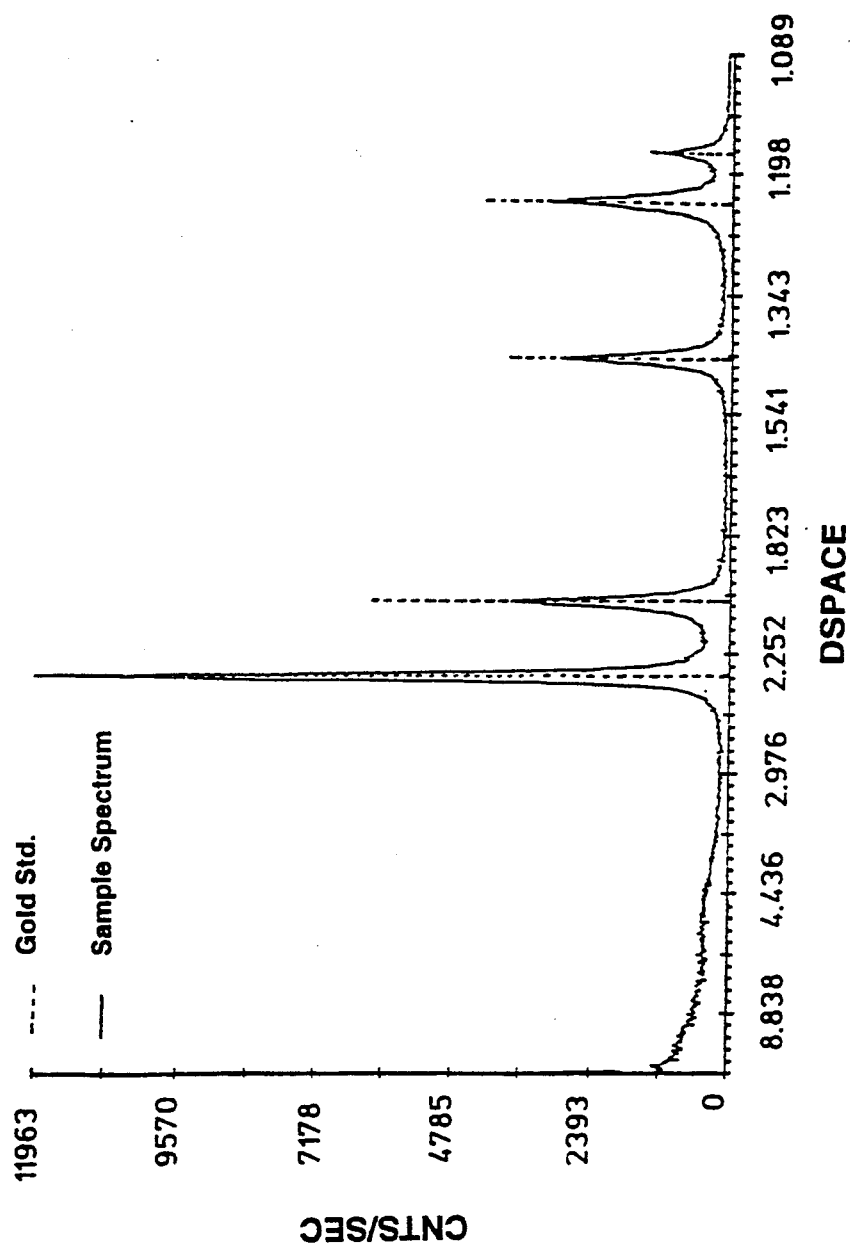
FIG. 1 shows x-ray diffraction pattern for the sodium borohydride (SBH) reduced products of carbonate eluates, Solutions A and B.
Figure 2:
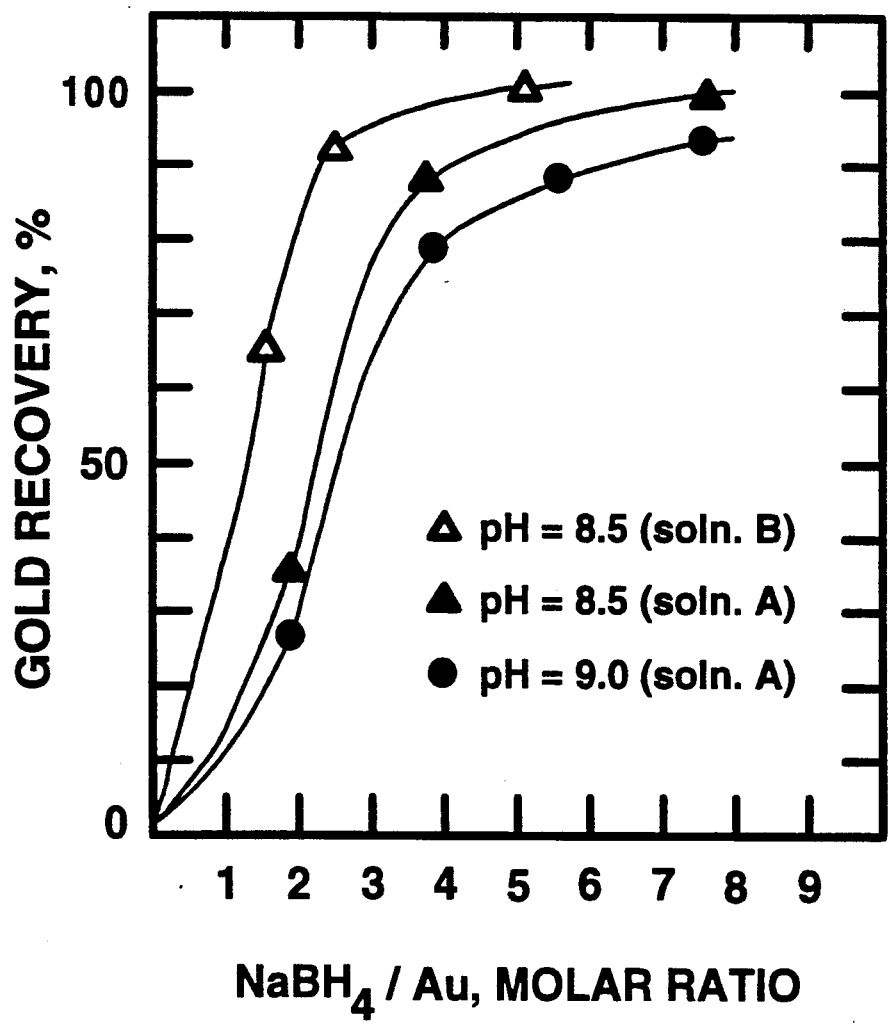
FIG. 2 shows the effect of sodium borohydride /gold (SBH/Au) molar ratio on reduction of gold from Solutions A and B, one hour reaction time, room temperature.

The amount of $NaBH_4$ required in equation (2) per mole of metal reduced is four times that required in equation (1). FIG. 2 represents the effect of the amount of $NaBH_4$ on the recovery of gold from Solutions A and B.

At a molar ratio of $NaBH_4/Au$ equal to 4 and 2.5, about 90% gold recovery was obtained for Solutions A and B (initial pH 8.4) respectively. The complete recovery of gold was achieved at a molar ratio of 7.5 (Solution A) and 5.0 (Solution B). The excess amount of $NaBH_4$ is required due to the complexed nature of the gold and silver in solution, as discussed earlier, the presence of other metal ions such as Cu, Fe and Ni which also consume some $NaBH_4$ and finally to the decomposition behaviour (hydrolysis) of $NaBH_4$ in aqueous solutions.

KINETICS

Figure 4:
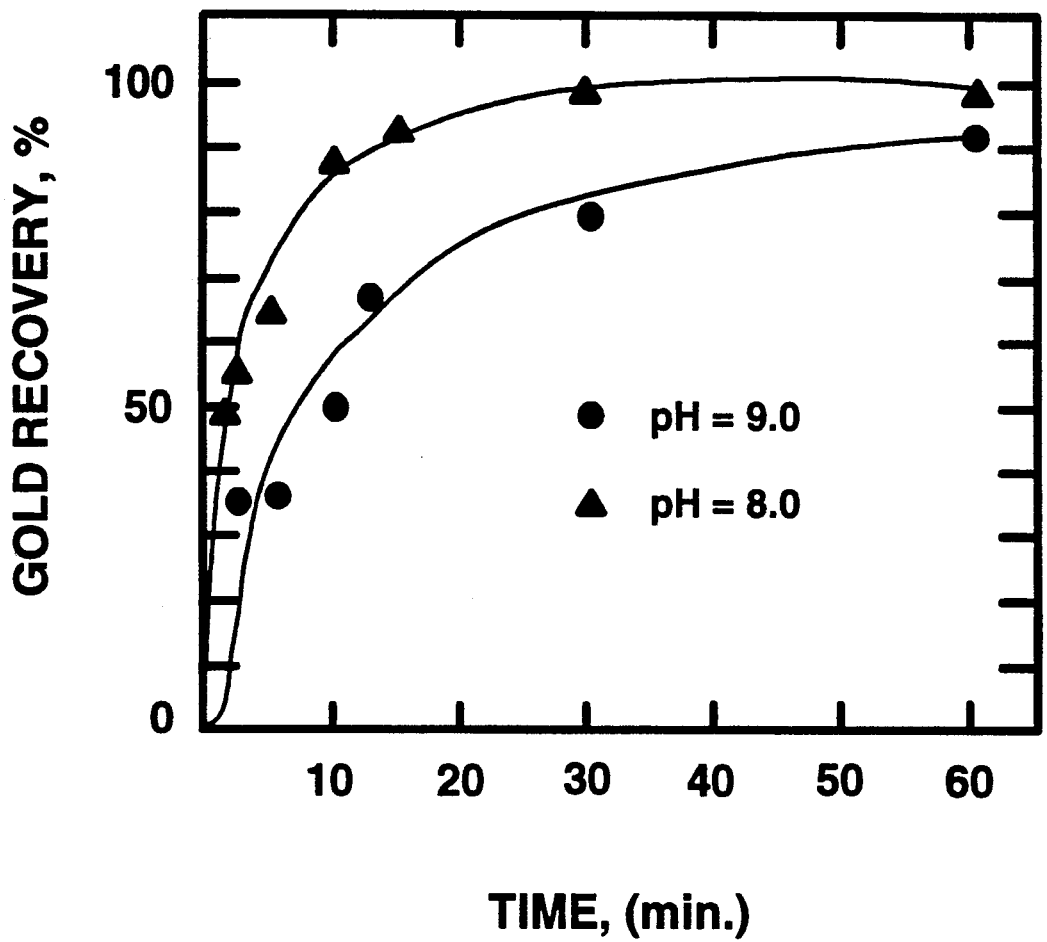
FIG. 4 shows gold reduction kinetics with SBH, 500 ml of Solution A, SBH/Au=7.6 at room temperature.

It has been found that the reduction from alkaline solution starts after an initial induction period, the duration of which depends on the initial solution pH as discussed earlier. FIG. 4 represents the variation of gold recovery with time for Solution A at initial pH values of 8 and 9. The reduction time could be halved if the initial pH decreased from 9 to 8. As indicated in FIG. 4, at pH=8.0, the reduction of gold from Solution A could reach its maximum value in less than 30 minutes while, at a pH of 9.0, one hour was required to achieve the maximum reduction.

Figure 5:
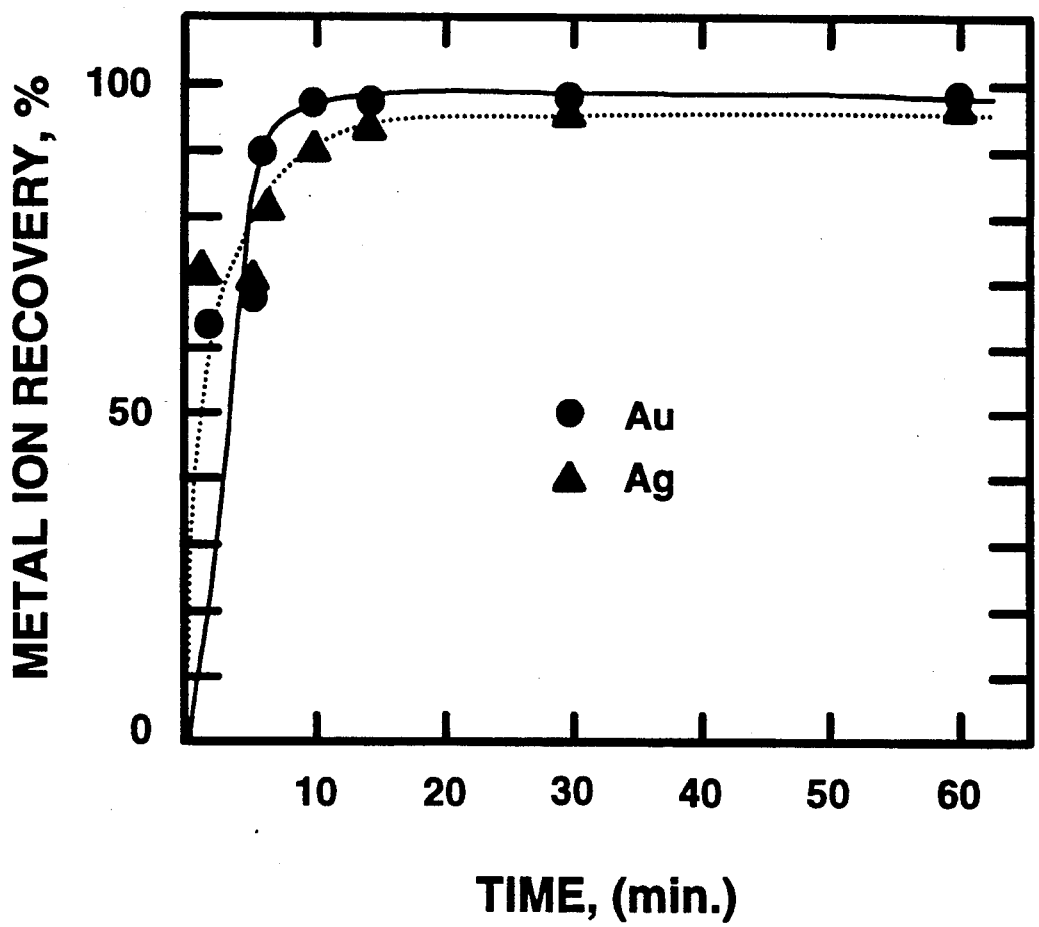
FIG. 5 shows reduction kinetics of gold and silver with SBH, 500 ml of Solution B, initial pH of 9.0, SBH/Au=5.0, room temperature.

In Solution B, the time required to complete the reduction was found to be much less than in Solution A at the same initial pH with the same amount of $NaBH_4$. The maximum recovery of gold and silver was achieved in about 10 minutes (FIG. 5) Significant amounts of silver, present with gold in Solution B (Table 2), could be reduced prior to gold reduction (Table 3). The reduced silver could enhance the precipitation of gold through an additional cementation mechanism.

TABLE 3

Electrode potentials for cyanide complexes

| Complex | E*, mV |
|---|---|
| $[Ag(CN)_2]^- + e = Ag + 2CN^-$ | −300 |
| $[Fe(CN)_6]^{3-} + e = Fe(CN)_6^{4-}$ | −360 |
| $[Cu(CN)_2]^- + e = Cu + 2CN^-$ | −430 |
| $[Ag(CN)_3]^{2-} + e = Ag + 3CN^-$ | −510 |
| $[Au(CN)_2]^- + e = Au + 2CN^-$ | −600 |
| $[Ni(CN)_4]^{2-} + e = [Ni(CN)_3]^{2-} + CN^-$ | −820 |
| $[Fe(CN)_6]^{4-} + 2e = Fe + 6CN^-$ | −1500 |

TEMPERATURES

It has been found that raising the temperature had a positive effect on gold recovery.

TABLE 4

The effect of temperature on the recovery of gold from carbonte solution

V = 100 mL, SBH/Au = 3.8 for soln. A
2.5 for soln. B
pH$_{init}$ = 9.0, Time = 30 min

| | Recovery, % | |
|---|---|---|
| Temp. °C. | Solution A | Solution B |
| 25 | 48.6 | 46.8 |
| 30 | 81.8 | 70.3 |
| 40 | 89.7 | 76.6 |
| 50 | 75.9 | 82.4 |

For example, the recovery of gold increased from 46% to 82% upon increasing the temperature from 25° C. to 50° C. for Solution B. In Solution A the recovery increased from about 48% at 25° C. to about 90% at 40° C. At 50° C., the recovery of gold in Solution A was decreased (Table 4) due to the promotion of gold residue redissolution by the hot cyanide solution.

Figure 6:
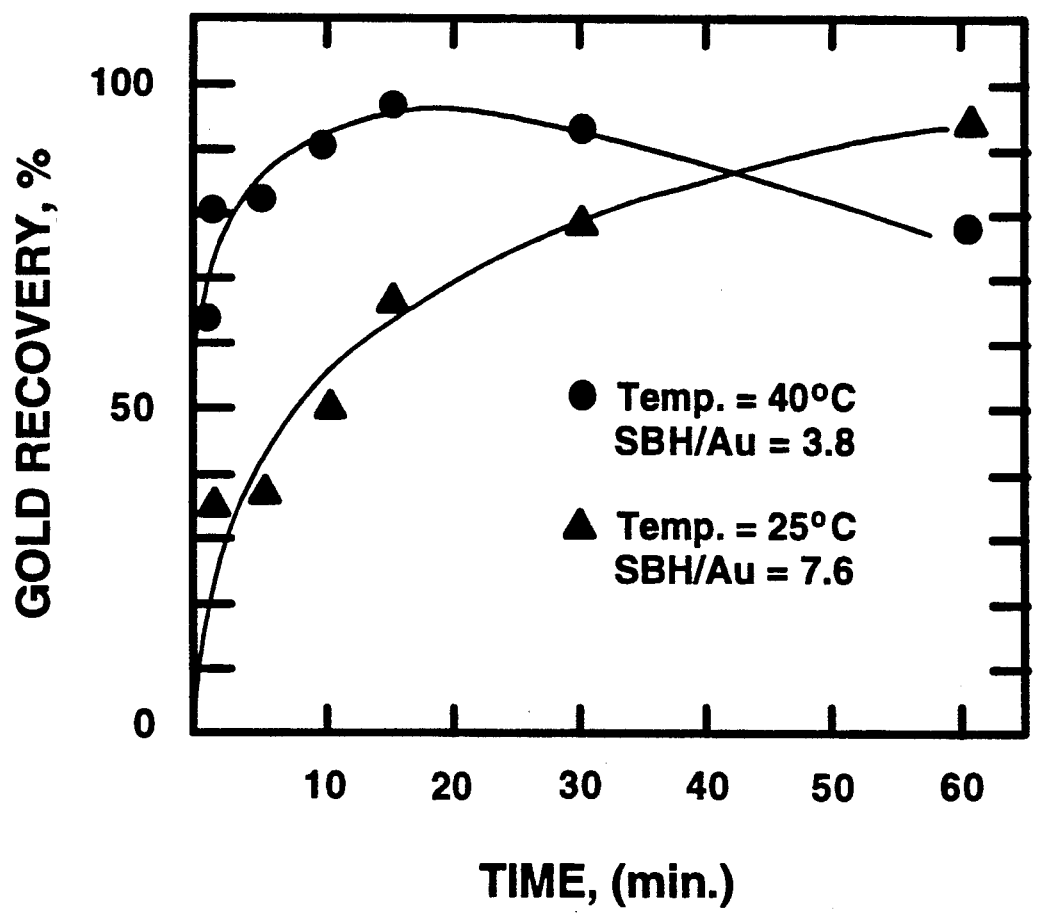
FIG. 6 shows kinetics of gold reduction at 25° and 40° C. with SBH, 500 ml of Solution A.
Figure 7A:
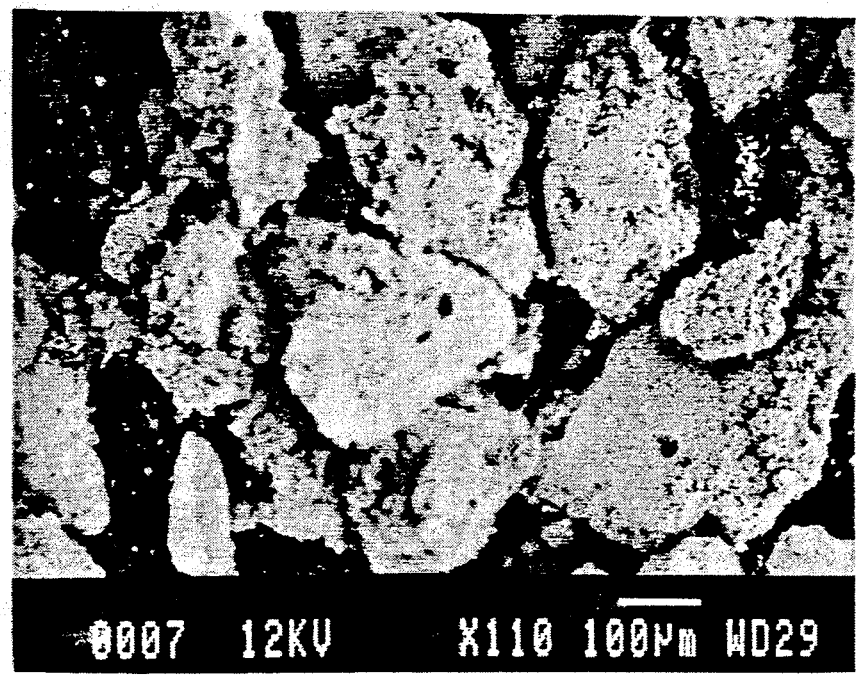
FIG. 7a is a scanning electron photomicrograph of Au/Ag reduction products from Solution A at 110X magnification.
Figure 7B:
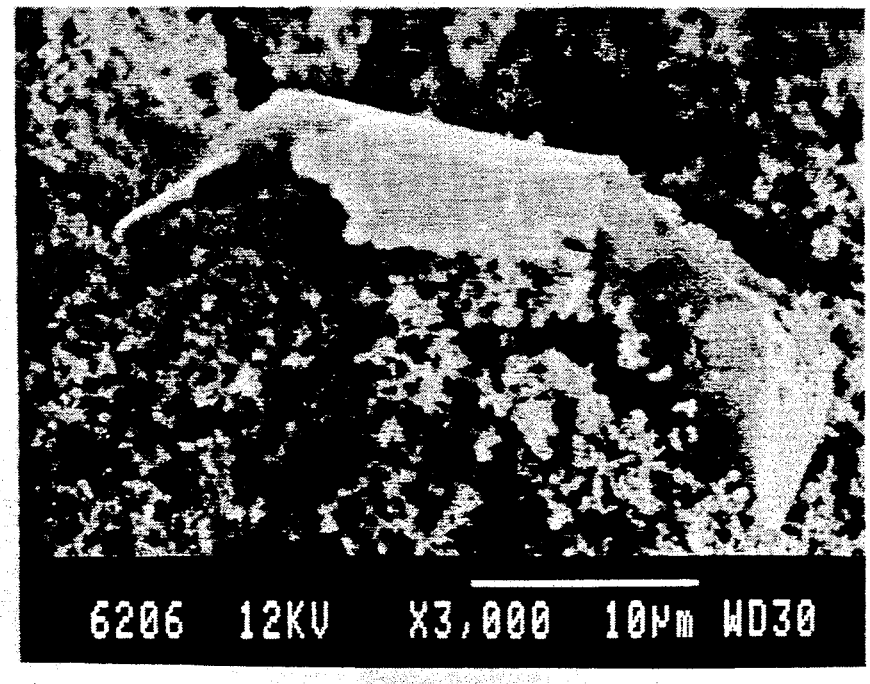
FIG. 7b is a scanning electron photomicrograph of Au/Ag reduction products from Solution A at 3,000X magnification.
Figure 8:
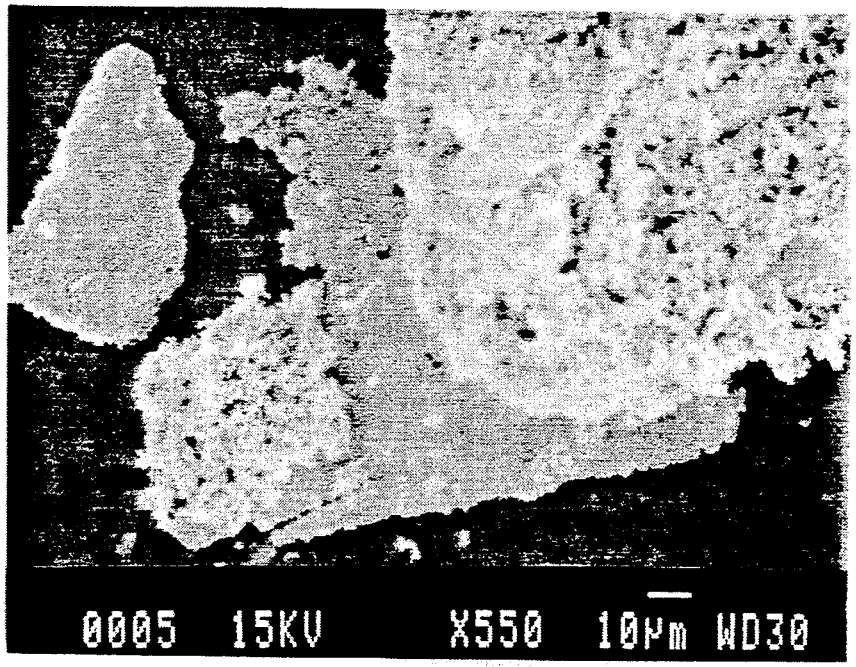
FIG. 8 is a scanning electron photomicrograph of Au/Ag reduction products from Solution B at 550X magnification.

It has also been found that a moderate increase in temperature has a positive effect on the kinetics of gold recovery from Solution A. As shown in FIG. 6, at 40° C., the maximum gold recovery was attained after 15 minutes reaction time, while at 25° C., the reaction took one hour to reach its maximum recovery starting from the same initial pH and only half the NaBH$_4$ dosage. When the reactants and products were left in contact for a longer period of time, a significant decrease in gold recovery was noted (FIG. 6). At 40° C. gold recovery was found to be stable up to 30 minutes contact (82%) but after one hour the recovery of gold also decreased (72%) as the precipitate started to redissolve.

Thus, in general it is preferred to operate the process at a temperature in the range of 25° C. to 40° C. for a period of 15 to 30 minutes.

CHARACTERIZATION

Scanning electron microscopy (SEM) and quantitative energy dispersive analysis (EDXA) were used to examine the precipitate derived from Solution A. It has been found that the precipitate was heterogeneous with gold content from 92 to 97 wt %, silver from 3 to 7 wt %, copper from 0.5 to 1.4 wt % and nickel from 0 to 0.6 wt %. Traces of discrete particles of MgFeSi and CaFeSi were also indicated.

The morphology of the powder derived from Solution B was found to be identical to that derived from Solution A. The chemical constitution was also similar except for a difference in gold to silver ratio. It was found that gold varied from 73 to 98 wt %, silver from 4 to 21 wt %, copper from 0 to 3 wt % and nickel from 0 to 7 wt %. The quantity and type of contaminants observed in this sample were also identical to those observed in Solution A. Hence, the overall purity of gold and silver and silver precipitate was found to be very high.

SELECTIVITY

It has been found that very small amounts of impurities were precipitated with gold and silver as indicated by the chemical analysis and quantitative dispersive analysis of the solid products (Table 3).

The measured potentials were found to decrease upon adding NaBH$_4$ (Table 6) and reached a minimum value (−770 mV) after 30 minutes reaction time. From Table 6, it is apparent that the sequence of reduction is in the following order:

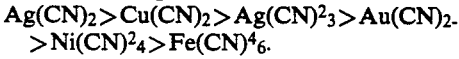
$Ag(CN)_2 > Cu(CN)_2 > Ag(CN)^2_3 > Au(CN)_2$
$> Ni(CN)^2_4 > Fe(CN)^4_6.$ Therefore, silver and gold in cyanide form can easily be reduced while the cyanide complexes of base metals, except for the monovalent copper complex, cannot. In addition, the higher cyanide complexes of base metals can be reduced to the lower complexes and not to the metallic form when NaBH$_4$ is employed as the reductant (Table 6). Accordingly, selective reduction of silver and gold (over base metals) can be achieved and the resulting product is highly pure (Table 5).

TABLE 5

Recovery of gold and silver from solutions A and B by SBH added as VenMet solution V = 50 mL, SBH/Au = 7.6 for Soln. A
5.0 for Soln. B
pH$_{init}$ = 8.0, Time = 10 min at room temperature

| | Recovery, % | | Product purity, %* | |
|---|---|---|---|---|
| Element | Solution A | Solution B | A | B |
| Au | 94.9 | 94.8 | 94.7 | 85.1 |
| Ag | 97.7 | 92.0 | 4.5 | 14.1 |
| Cu | 38.5 | 8.5 | 0.8 | 0.2 |
| Ni | 0 | 4.4 | 0 | 0.5 |
| Fe | 0 | 4.2 | 0 | 0.1 |

*Calculated by difference

TABLE 6

The change of pH and potentials with time during the reduction of gold and silver in carbonate solutions by SBH V = 500 mL, SBH/Au = 7.6 for soln. A
5.0 for soln. B
pH$_{init}$ = 9.0 at room temperature

| | Solution A | | Solution B | |
|---|---|---|---|---|
| Time, min | pH | mV | pH | mV |
| 0 | 9.00 | 109 | 9.00 | 172 |
| 1 | 9.33 | −205 | 9.06 | −335 |
| 2 | 9.32 | −368 | 8.93 | −540 |
| 5 | 9.32 | −698 | — | — |
| 6 | — | — | 8.53 | −741 |
| 10 | 9.33 | −756 | 8.03 | −785 |
| 15 | 9.33 | −764 | 7.75 | −784 |
| 30 | 9.34 | −770 | 9.27 | −790 |
| 60 | 9.34 | −770 | 9.34 | −775 |

ECONOMICS

The following Table 7 is a preliminary economic analysis of sodium borohydride processing in comparison with electrowinning.

TABLE 7

Gold recovery from carbon eluate solution by
electrowinning and VenMet precipitation
Process capital cost estimate, October, 1990 Canadian dollars

| Item | EW | VenMet |
|---|---|---|
| Delivered equipment | 264,000 | 53,000 |
| Installation | 69,000 | 14,000 |
| Equipment foundations | 29,000 | 6,000 |
| Support structures | 26,000 | 5,000 |
| Piping | 66,000 | 13,000 |
| Electrical | 40,000 | 8,000 |
| Instrumentation | 21,000 | 4,000 |
| Total direct | 515,000 | 103,000 |
| Engineering | 41,000 | 8,000 |
| Management | 36,000 | 7,000 |
| Construction expenses | 52,000 | 10,000 |
| Total indirect | 129,000 | 25,000 |
| Total direct plus indirect | 644,000 | 128,000 |
| Contingency | 97,000 | 32,000 |
| Fixed capital cost | 741,000 | 160,000 |
| Plant operation | | |
| Operating labour | 85,200 | 25,000 |
| Maintenance labour | 13,100 | 1,400 |
| Spare parts | 8,000 | 600 |
| Operating supplies | 4,200 | 400 |
| Total operation | 110,500 | 27,000 |
| Utilities | | |
| Electric power | 1,100 | 200 |
| Fuel oil | 400 | |
| Total utility | 1,500 | 200 |
| Reagents | | |
| Steel wool | 1,000 | |
| Flux | 2,700 | |
| VenMet solution | | 49,700 |
| Sulphuric acid 93% | | 13,700 |
| Calcium hydroxide | | 12,200 |
| Total reagent | 3,700 | 75,600 |
| Total direct cost | 2,700 | 103,200 |
| Capital charge | | |
| 15 years @ 13% interest | 114,700 | 24,800 |
| Total annual cost | 230,400 | 128,000 |
| Cost per gram of gold ¢ | 15.4 | 8.6 |

Notes:
EW costs cover electrowinning and steel wool cathode smelting system to recover gold in dore bars.
VenMet costs cover acid pH reduction, VenMet reagent precipitation of gold, recovery by filtration and readjustment of eluate pH with calcium hydroxide.

The $NaBH_4$ based process is economically attractive because the capital investment required is significantly lower than for electrowinning. Operating costs (excluding consumables) are also lower, principally because less labour is required for the $NaBH_4$ process which is considerably simpler than electrowinning and is conducted under ambient conditions. However, the savings in non-consumables are almost cancelled out by the increased reagent costs incurred by the $NaBH_4$ process. Therefore, the economics realized through the use of $NaBH_4$ are gained from the great reduction in capital costs. An added benefit of using $NaBH_4$ is the relatively high grade of the product. The speed of the reduction reaction also means that "in-process" gold and silver inventories are reduced.

A key advantage of the invention is that recovery of high purity gold and/or silver by reduction precipitation with a stabilized alkali metal borohydride can be employed in the final steps of already established and commercially viable gold and silver recovery processes as will be demonstrated below.

Figure 9:
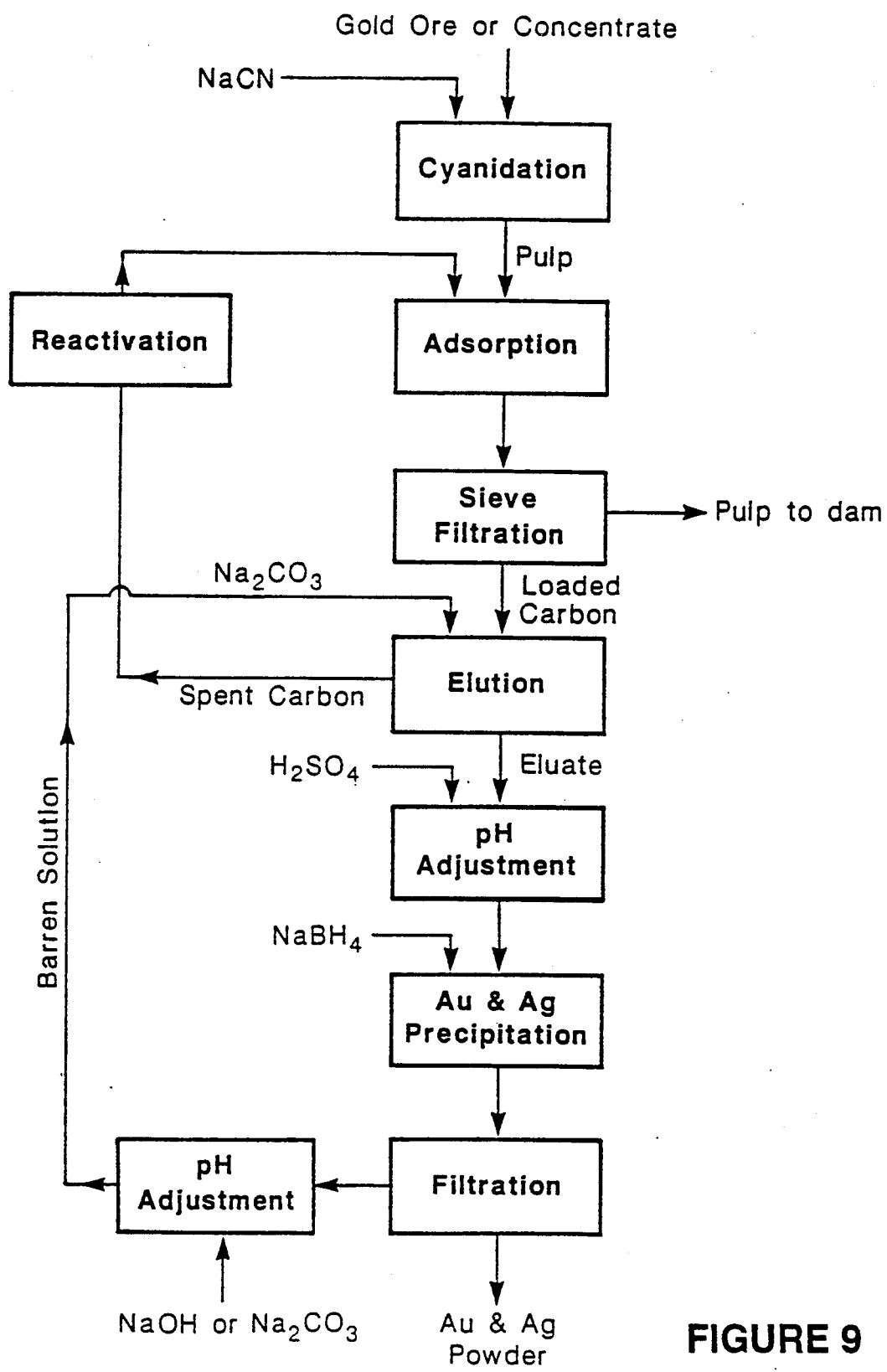
FIG. 9 is a flowsheet for the recovery of gold and silver from carbonate eluates in carbon-in-pulp process (CIP) by SBH reduction.

In the embodiment shown in FIG. 9, gold ore or concentrate is leached with a cyanide solution in accordance with known methods. Gold values in the pulp are then adsorbed on activated carbon in accordance with established carbon-in-pulp technology. Carbon is then separated by sieve filtration and the remaining ore residue and liquid (pulp) is further treated or expelled as waste. The separated carbon is eluted with sodium carbonate and the resultant eluate is then separated and adjusted with sulphuric acid to the optimum pH for gold precipitation (pH=8-10). The resultant eluate is then treated with stabilized sodium borohydride to induce reduction precipitation. The precipitated gold and/or silver powder is recovered by filtration. Optionally, the barren solution can be recycled to the upstream (stripping) elution stage after pH adjustment with NaOH or $Na_2CO_3$.

I claim:

1. A process for recovering high purity metallic gold and silver from a basic carbonate solution containing gold and/or silver values, which comprises:
   (a) adjusting the pH value of the gold and/or silver-containing solution with acid to a level between 7 and 11;
   (b) treating the alkaline solution with stabilized alkali metal borohydride in an amount at least stoichiometrically equal to the amount of gold and/or silver compounds present in gold and/or silver solution so as to precipitate metallic gold and/or silver; and
   (c) separating the metallic precipitate.

2. A process as claimed in claim 1 and including the step of (d) recycling the barren solution to the upstream process.

3. A process as claimed in claim 1, wherein the stabilized alkali metal borohydride solution contains about 0.45% to 5% by weight of borohydride and about 1.75% to 17% by weight of hydroxide, respectively.

4. A process as claimed in claim 1, wherein the stabilized alkali metal borohydride is stabilized sodium or potassium borohydride.

5. A process as claimed in claim 4, wherein the stabilized alkali metal borohydride is in the form of a stabilized aqueous solution containing sodium or potassium borohydride and sodium or potassium hydroxide.

6. A process as claimed in claim 1, wherein the basic carbonate solution is an aqueous solution obtained in the final recovery step of the leaching of gold and/or silver ore or concentrate by an initial adsorption on carbon followed by elution of the loaded carbon with sodium carbonate.

7. A process as claimed in claim 1, wherein the treatment of the basic carbonate solution with stabilized alkali metal borohydride is effected at ambient temperature and pressure.

8. A process as claimed in claim 1, wherein the basic carbonate solution has a pH in the range of 7.0 to 10.0.

9. A process as claimed in claim 1, wherein the basic carbonate solution has a pH in the range of about 8.0 to 9.0.

10. A process as claimed in claim 1, wherein the process is operated at a temperature in the range of 25° C. to 40° C., and for a period of 15 to 30 minutes.

11. A process as claimed in claim 1, wherein the carbonate solution contains gold and/or silver values and at least one of zinc, iron, cobalt, nickel, copper or cyanide ions.

* * * * *

UNITED STATES PATENT AND TRADEMARK OFFICE
CERTIFICATE OF CORRECTION

PATENT NO. : 5,261,945

DATED : November 16, 1993

INVENTOR(S) : F. Awadalla

It is certified that error appears in the above-identified patent and that said Letters Patent is hereby corrected as shown below:

In claim 1, at line 25 of column 8, delete "gold and/or silver" and insert --the--; and at line 28 of column 8, delete "the" and insert --gold and/or silver--.

Signed and Sealed this

Seventh Day of June, 1994

Attest:

BRUCE LEHMAN

Attesting Officer     Commissioner of Patents and Trademarks